(12) United States Patent
Xiao

(10) Patent No.: US 11,409,819 B2
(45) Date of Patent: Aug. 9, 2022

(54) METHOD AND DEVICE FOR RECOMMENDING SOCIAL USER

(71) Applicant: SHANGHAI ZHANGMEN SCIENCE AND TECHNOLOGY CO., LTD., Shanghai (CN)

(72) Inventor: Shushan Xiao, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 222 days.

(21) Appl. No.: 16/729,534

(22) Filed: Dec. 30, 2019

(65) Prior Publication Data

US 2020/0133985 A1    Apr. 30, 2020

Related U.S. Application Data

(63) Continuation of application No. PCT/CN2018/089644, filed on Jun. 1, 2018.

(30) Foreign Application Priority Data

Jun. 30, 2017   (CN) .......................... 201710523277.6

(51) Int. Cl.
*G06F 16/9535* (2019.01)
*H04W 76/10* (2018.01)
(Continued)

(52) U.S. Cl.
CPC .... *G06F 16/9535* (2019.01); *G06F 16/24578* (2019.01); *G06F 16/9536* (2019.01);
(Continued)

(58) Field of Classification Search
CPC ........... G06F 16/24578; G06F 16/9537; G06F 16/9535; G06F 16/9536; G06Q 10/10;
(Continued)

(56) References Cited

U.S. PATENT DOCUMENTS

| 10,567,962 B1 * | 2/2020 | Lu ......................... H04W 12/08 |
| 2007/0110010 A1 * | 5/2007 | Kotola .................... H04W 4/80 370/338 |

(Continued)

FOREIGN PATENT DOCUMENTS

| CN | 101272398 A | 9/2008 |
| CN | 101909281 A | 12/2010 |

(Continued)

*Primary Examiner* — Etienne P Leroux
(74) *Attorney, Agent, or Firm* — Bayramoglu Law Offices LLC

(57) ABSTRACT

A method for recommending a social user includes: acquiring the first user identification information corresponding to the user equipment, wherein, the user equipment is wirelessly connected to a wireless access point; sending the first user identification information and the corresponding access point identification information of the wireless access point to a second network device; receiving one or more pieces of second social user information returned by the second network device, wherein the second social user information corresponds to the access point identification information; and sending at least one of the one or more pieces of the second social user information to the user equipment. The method recommends social users on the basis of a shared wireless access point, thereby facilitating offline socialization because of the short physical distance between recommended social users who are connected to the shared wireless access point.

12 Claims, 4 Drawing Sheets

(51) Int. Cl.
*G06F 16/9537* (2019.01)
*G06F 16/2457* (2019.01)
*G06F 16/9536* (2019.01)
*H04L 51/52* (2022.01)

(52) U.S. Cl.
CPC .......... *G06F 16/9537* (2019.01); *H04L 51/52* (2022.05); *H04W 76/10* (2018.02)

(58) Field of Classification Search
CPC ....... G06Q 50/01; H04L 51/32; H04W 76/11; H04W 76/10
See application file for complete search history.

(56) References Cited

U.S. PATENT DOCUMENTS

| | | | | | |
|---|---|---|---|---|---|
| 2008/0159536 | A1* | 7/2008 | Chang | ................ | H04W 12/033 380/258 |
| 2009/0100136 | A1* | 4/2009 | Jarenskog | ............. | G06Q 10/10 709/204 |
| 2009/0150321 | A1* | 6/2009 | Ning | ...................... | G06N 5/047 706/48 |
| 2013/0124735 | A1* | 5/2013 | Shin | .................... | H04L 61/2582 709/226 |
| 2014/0024403 | A1* | 1/2014 | Yao | ........................ | H04L 5/0037 455/509 |
| 2014/0058753 | A1* | 2/2014 | Wild | ....................... | G16H 80/00 705/3 |
| 2015/0030212 | A1* | 1/2015 | Cavanagh | ........... | G06K 9/00979 382/115 |
| 2015/0186406 | A1* | 7/2015 | Nadimi | .................. | G06Q 50/01 707/610 |
| 2015/0304799 | A1* | 10/2015 | Park | .................... | H04W 72/048 370/329 |
| 2017/0006039 | A1* | 1/2017 | Ernohazy | ............ | H04L 63/102 |
| 2017/0118303 | A1* | 4/2017 | Ratiu | ................. | G06Q 30/0244 |
| 2017/0142044 | A1* | 5/2017 | Ball | ....................... | G06Q 50/01 |
| 2017/0208631 | A1* | 7/2017 | Freudiger | .............. | H04L 67/02 |
| 2017/0245106 | A1* | 8/2017 | Connelly | ............ | H04W 72/048 |
| 2018/0167870 | A1* | 6/2018 | Masini | .................. | H04W 76/10 |

FOREIGN PATENT DOCUMENTS

| | | |
|---|---|---|
| CN | 102624747 A | 8/2012 |
| CN | 104967732 A | 10/2015 |
| CN | 107135149 A | 9/2017 |

* cited by examiner

METHOD AND DEVICE FOR RECOMMENDING SOCIAL USER

CROSS REFERENCE TO THE RELATED APPLICATIONS

This application is the continuation application of International Application No. PCT/CN2018/089644, filed on Jun. 1, 2018, which is based upon and claims priority to Chinese Patent Application No. 201710523277.6, filed on Jun. 30, 2017, the entire contents of which are incorporated herein by reference.

TECHNICAL FIELD

The present disclosure relates to the field of communication, in particular to a technology for recommending a social user.

BACKGROUND

People use online communication methods for communicating with others. Electronics products such as smart phones, computers and others are gadgets that can be used to enable online communication with others. Online communication platforms usually assist users to establish social contact with others by giving users an option of friend recommendation. However, in the prior art, the friends that are recommended to users are merely cyber friends, which are less likely to become friends in reality.

SUMMARY

An objective of the present disclosure is to provide a method and a device for recommending a social user.

According to the first aspect of the present disclosure, a method for recommending a social user at a first network device end includes:
acquiring first user identification information corresponding to a user equipment, wherein, the user equipment is wirelessly connected to the wireless access point;
sending the first user identification information and the corresponding access point identification information of a wireless access point to a second network device;
receiving one or more pieces of second social user information returned by the second network device, wherein, the second social user information corresponds to the access point identification information; and
sending at least one of the one or more pieces of the second social user information to the user equipment.

According to the second aspect of the present disclosure, a method for recommending a social user at a second network device end includes:
receiving first user identification information sent by a first network device and the corresponding access point identification information of a wireless access point, wherein, the user equipment corresponding to the first user identification information is wirelessly connected to the wireless access point;
determining one or more pieces of second social user information according to the access point identification information, wherein, the second social user information corresponds to the access point identification information; and
sending at least one of the one or more pieces of the second social user information to the first network device.

According to the third aspect of the present disclosure, a method for recommending a social user at a user equipment end includes:
sending first user identification information corresponding to the user equipment to a first network device by a wireless connection between the user equipment and a wireless access point; and
receiving one or more pieces of second social user information returned by the first network device, wherein, the second social user information corresponds to access point identification information of the wireless access point.

According to the fourth aspect of the present disclosure, a method for recommending a social user at a first network device end includes:
acquiring first user identification information corresponding to the user equipment, wherein, the user equipment is wirelessly connected to a wireless access point; and
sending the first user identification information and the corresponding access point identification information of the wireless access point to a second network device.

According to the fifth aspect of the present disclosure, a method for recommending a social user at a second network device end includes:
receiving the first user identification information sent by a first network device and the corresponding access point identification information of a wireless access point, wherein, user equipment corresponding to the first user identification information is wirelessly connected to the wireless access point;
determining one or more pieces of second social user information according to the access point identification information, wherein, the second social user information corresponds to the access point identification information; and
sending at least one of the one or more pieces of the second social user information to the user equipment.

According to the sixth aspect of the present disclosure, a method for recommending a social user at a user equipment end includes:
sending first user identification information corresponding to user equipment to a first network device by a wireless connection between the user equipment and a wireless access point; and
receiving one or more pieces of second social user information returned by a second network device, wherein, the second social user information corresponds to access point identification information of the wireless access point.

According to the seventh aspect of the present disclosure, a method for recommending a social user at a second network device end includes:
receiving the first user identification information sent by the user equipment and the corresponding access point identification information of a wireless access point, wherein, the user equipment is wirelessly connected to the wireless access point;
determining one or more pieces of second social user information according to the access point identification information, wherein, the second social user information corresponds to the access point identification information; and
sending at least one of the one or more pieces of the second social user information to the user equipment.

According to the eighth aspect of the present disclosure, a method for recommending a social user at a network device end includes:
sending the first user identification information corresponding to the user equipment and the corresponding access point identification information of a wireless access point to a second network device, wherein, the user equipment is wirelessly connected to the wireless access point; and receiving one or more pieces of the second social user information returned by the second network device, wherein, the second social user information corresponds to the access point identification information of the wireless access point.

According to the ninth aspect of the present disclosure, a method for recommending a social user includes:

the user equipment sends the first user identification information corresponding to the user equipment to a first network device by a wireless connection between the user equipment and a wireless access point;

the first network device acquires the first user identification information and sends the first user identification information and the corresponding access point identification information of the wireless access point to a second network device;

the second network device receives the first user identification information and the corresponding access point identification information, and determines one or more pieces of second social user information according to the access point identification information, wherein, the second social user information corresponds to the access point identification information;

the second network device sends at least one of the one or more pieces of the second social user information to the first network device;

the first network device receives the one or more pieces of the second social user information, and sends at least one of the one or more pieces of the second social user information to the user equipment; and the user equipment receives the one or more pieces of the second social user information.

According to the tenth aspect of the present disclosure, a method for recommending a social user includes:

the user equipment sends the first user identification information corresponding to the user equipment to a first network device by a wireless connection between the user equipment and a wireless access point;

the first network device acquires the first user identification information and sends the first user identification information and the corresponding access point identification information of the wireless access point to a second network device;

the second network device receives the first user identification information and the corresponding access point identification information, and determines one or more pieces of second social user information according to the access point identification information, wherein, the second social user information corresponds to the access point identification information;

the second network device sends at least one of the one or more pieces of the second social user information to the user equipment; and the user equipment receives the one or more pieces of the second social user information.

According to the eleventh aspect of the present disclosure, a method for recommending a social user includes:

the user equipment sends the first user identification information corresponding to the user equipment and the corresponding access point identification information of a wireless access point to a second network device, wherein, the user equipment is wirelessly connected to the wireless access point;

the second network device receives the first user identification information and the corresponding access point identification information, and determines one or more pieces of second social user information according to the access point identification information, wherein, the second social user information corresponds to the access point identification information;

the second network device sends at least one of the one or more pieces of the second social user information to the user equipment; and the user equipment receives the one or more pieces of the second social user information.

According to the twelfth aspect of the present disclosure, a device for recommending a social user includes:

a processor;

a memory configured to store a computer executable instruction, wherein, the computer executable instruction enables the processor to execute the following steps:

acquiring the first user identification information corresponding to the user equipment, wherein, the user equipment is wirelessly connected to a wireless access point;

sending the first user identification information and the corresponding access point identification information of a wireless access point to a second network device;

receiving one or more pieces of the second social user information returned by the second network device, wherein, the second social user information corresponds to the access point identification information; and sending at least one of the one or more pieces of the second social user information to the user equipment.

According to the thirteenth aspect of the present disclosure, a device for recommending a social user includes:

a processor;

a memory configured to store a computer executable instruction, wherein, the computer executable instruction enables the processor to execute the following steps:

receiving the first user identification information sent by a first network device and the corresponding access point identification information of a wireless access point, wherein, user equipment corresponding to the first user identification information is wirelessly connected to the wireless access point;

determining one or more pieces of second social user information according to the access point identification information, wherein, the second social user information corresponds to the access point identification information; and sending at least one of the one or more pieces of the second social user information to the first network device.

According to the fourteenth aspect of the present disclosure, a device for recommending a social user includes:

a processor;

a memory configured to store a computer executable instruction, wherein, the computer executable instruction enables the processor to execute the following steps:

sending the first user identification information corresponding to the user equipment to a first network device by a wireless connection between the user equipment and a wireless access point; and receiving one or more pieces of the second social user information returned by the first network device, wherein, the second social user information corresponds to access point identification information of a wireless access point.

According to the fifteenth aspect of the present disclosure, a device for recommending a social user, includes:

a processor;

a memory configured to store a computer executable instruction, wherein, the computer executable instruction enables the processor to execute the following steps:

acquiring the first user identification information corresponding to user equipment, wherein, the user equipment is wirelessly connected to a wireless access point; and sending the first user identification information and the corresponding access point identification information of a wireless access point to a second network device.

According to the sixteenth aspect of the present disclosure, a device for recommending a social user, includes:

a processor;

a memory configured to store a computer executable instruction, wherein, the computer executable instruction enables the processor to execute the following steps:

receiving the first user identification information sent by a first network device and the corresponding access point identification information of a wireless access point, wherein, the user equipment corresponding to the first user identification information is wirelessly connected to the wireless access point;

determining one or more pieces of second social user information according to the access point identification information, wherein, the second social user information corresponds to the access point identification information; and sending at least one of the one or more pieces of the second social user information to user equipment.

According to a seventeenth aspect of the present disclosure, a device for recommending a social user, includes:

a processor;

a memory configured to store a computer executable instruction, wherein, the computer executable instruction enables the processor to execute the following steps:

sending the first user identification information corresponding to user equipment to a first network device by a wireless connection between the user equipment and a wireless access point; and receiving one or more pieces of the second social user information returned by a second network device, wherein, the second social user information corresponds to access point identification information of a wireless access point.

According to the eighteenth aspect of the present disclosure, a device for recommending a social user includes:

a processor;

a memory configured to store a computer executable instruction, wherein, the computer executable instruction enables the processor to execute the following steps:

receiving the first user identification information sent by user equipment and the corresponding access point identification information of a wireless access point, wherein, the user equipment is wirelessly connected to the wireless access point;

determining one or more pieces of second social user information according to the access point identification information, wherein, the second social user information corresponds to the access point identification information; and sending at least one of the one or more pieces of the second social user information to the user equipment.

According to the nineteenth aspect of the present disclosure, a device for recommending a social user includes:

a processor;

a memory configured to store a computer executable instruction, wherein, the computer executable instruction enables the processor to execute the following steps:

sending the first user identification information corresponding to user equipment and the corresponding access point identification information of a wireless access point to a second network device, wherein, the user equipment is wirelessly connected to the wireless access point; and receiving one or more pieces of the second social user information returned by the second network device, wherein, the second social user information corresponds to the access point identification information of the wireless access point.

According to the twentieth aspect of the present disclosure, a computer executable medium including an instruction is provided, and the instructions, when executed, enables a system to perform the following steps:

acquiring the first user identification information corresponding to user equipment, wherein, the user equipment is wirelessly connected to a wireless access point;

sending the first user identification information and the corresponding access point identification information of a wireless access point to a second network device;

receiving one or more pieces of the second social user information returned by the second network device, wherein, the second social user information corresponds to the access point identification information; and sending at least one of the one or more pieces of the second social user information to the user equipment.

According to the twenty-first aspect of the present disclosure, a computer executable medium including an instruction is provided, and the instruction, when executed, enables a system to perform the following steps:

receiving the first user identification information sent by a first network device and the corresponding access point identification information of a wireless access point, wherein, the user equipment corresponding to the first user identification information is wirelessly connected to the wireless access point;

determining one or more pieces of second social user information according to the access point identification information, wherein, the second social user information corresponds to the access point identification information; and sending at least one of the one or more pieces of the second social user information to the first network device.

According to the twenty-second aspect of the present disclosure, a computer executable medium including an instruction is provided, and the instruction, when executed, enables a system to perform the following steps:

sending the first user identification information corresponding to the user equipment to a first network device by a wireless connection between the user equipment and a wireless access point; and receiving one or more pieces of the second social user information returned by the first network device, wherein, the second social user information corresponds to access point identification information of a wireless access point.

According to the twenty-third aspect of the present disclosure, a computer executable medium including an instruction is provided, and the instruction, when executed, enables a system to perform the following steps:

acquiring the first user identification information corresponding to the user equipment, wherein, the user equipment is wirelessly connected to a wireless access point; and sending the first user identification information and the corresponding access point identification information of a wireless access point to a second network device.

According to the twenty-forth aspect of the present disclosure, a computer executable medium including an instruction is provided, and the instruction, when executed, enables a system to perform the following steps:

receiving the first user identification information sent by a first network device and the corresponding access point identification information of a wireless access point, wherein, the user equipment corresponding to the first user identification information is wirelessly connected to the wireless access point;

determining one or more pieces of second social user information according to the access point identification information, wherein, the second social user information corresponds to the access point identification information; and sending at least one of the one or more pieces of the second social user information to user equipment.

According to the twenty-fifth aspect of the present disclosure, a computer executable medium including an instruction is provided, and the instruction, when executed, enables a system to perform the following steps:

sending the first user identification information corresponding to the user equipment to a first network device by a wireless connection between the user equipment and a wireless access point; and receiving one or more pieces of the second social user information returned by a second network device, wherein, the second social user information corresponds to access point identification information of a wireless access point.

According to the twenty-sixth aspect of the present disclosure, a computer executable medium including an instruction is provided, and the instruction, when executed, enables a system to perform the following steps:

receiving the first user identification information sent by the user equipment and the corresponding access point identification information of a wireless access point, wherein, the user equipment is wirelessly connected to the wireless access point;

determining one or more pieces of second social user information according to the access point identification information, wherein, the second social user information corresponds to the access point identification information; and sending at least one of the one or more pieces of the second social user information to the user equipment.

According to the twenty-eighth aspect of the present disclosure, a computer executable medium including an instruction is provided, and the instruction, when executed, enables a system to perform the following steps:

sending the first user identification information corresponding to the user equipment and the corresponding access point identification information of a wireless access point to a second network device, wherein, the user equipment is wirelessly connected to the wireless access point; and receiving one or more pieces of the second social user information returned by the second network device, wherein, the second social user information corresponds to the access point identification information of the wireless access point.

Compared with the prior art, the present disclosure provides recommendation of social users on the basis of a shared wireless access point, which not only helps a social user to expand relationship networks, but also facilitates off-line socialization because of the short physical distance between recommended social users who are connected to the shared wireless access point. Moreover, the present disclosure may also give priority based on the information such as the number or frequency of the user connecting to a same wireless access point, which helps the user to find a better matched offline social friends and further improves the user's social experience.

BRIEF DESCRIPTION OF THE DRAWINGS

The list of drawings presented below, will be used to describe nonrestrictive embodiments in detail, to explain the features, objectives, and advantages of the present disclosure clearly.

The same or similar reference numerals in the drawings indicate the same or similar parts.

DETAILED DESCRIPTION OF THE EMBODIMENTS

Figure 1:
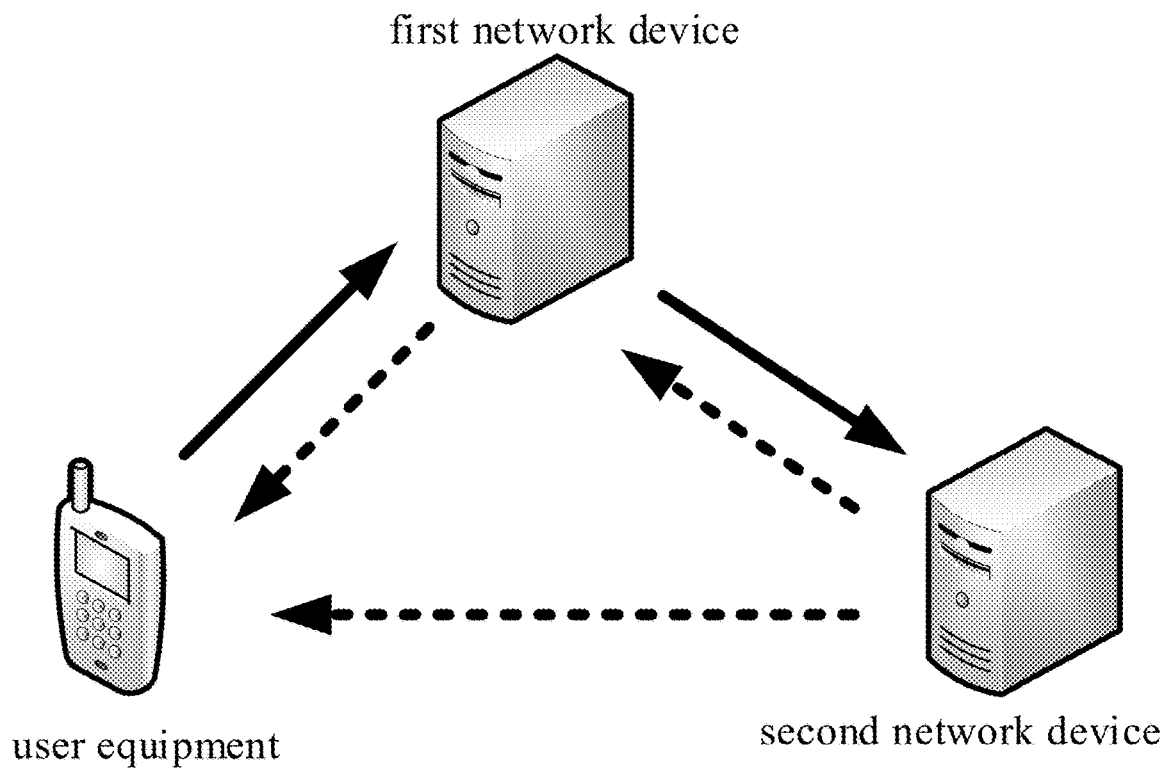
FIG. 1 shows a topology diagram of a system for recommending a social user according to an embodiment of the present disclosure.

The present disclosure will be further described in detail in conjunction with the drawings.

In a typical configuration in the present disclosure, each of a terminal, a service network device, and a trusted party includes one or more processors (CPUs), an input/output interface, a network interface, and a memory.

The memory may include a non-persistent memory and/or a non-volatile memory of computer-readable media such as a random access memory (RAM) and a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. The computer storage media includes, but are not limited to, a phase-change RAM (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage, other magnetic storage device, or any other non-transmission media capable of storing information that a computing device can access.

A device, or equipment, in the present disclosure includes, but is not limited to, user equipment, a network device, or a device formed by integrating the user equipment and the network device through a network. The user equipment includes, but is not limited to, any mobile electronic product that can perform human-computer interaction with a user, such as a smart phone, a tablet computer and the like. The mobile electronic product can adopt any operating system, such as an android operating system, an i-phone operating system (iOS) and the like. The network device includes an electronic device capable of automatically performing numerical calculation and information processing according to an instruction set or stored in advance. Hardware of the network device includes, but is not limited to, a microprocessor, an application specific integrated circuit (ASIC), a programmable logic device (PLD), a field programmable gate array (FPGA), a digital signal processor (DSP), an embedded device and the like. The network device includes, but is not limited to, a computer, a network host, a single network server, a plurality of network server sets, or a cloud composed of a plurality of servers. In this case, the cloud is composed of a large quantity of computers or network servers based on cloud computing. Cloud computing is a type of distributed computing, and is a virtual supercomputer composed of a group of loosely coupled computer sets. The network includes, but is not limited to, the Internet, a wide area network, a metropolitan area network, a local area network, a Virtual Private Network (VPN) network, a wireless ad hoc network and the like. Preferably, the device may include a program running on the user equipment, the network device, or the user equipment and the network device, the network device, a touch terminal, or a device formed by integrating the network device and the touch terminal through a network.

Certainly, those skilled in the art should understand that the device above is only an example, and other existing or prospective devices that are applied to the present disclosure, shall also fall within the scope of the protection of the present disclosure and hereby incorporated by reference.

In the description of the present disclosure, the meaning of "a plurality of" is two or more, unless otherwise specified.

FIG. 1 shows a typical application scenario of the present disclosure. A second network device recommends the second social user information to a first user based on the first user identification information, and an access point identification information of a wireless access point. Here, the first user identification information can be sent by the user equipment to the first network device, and then sent by the first network device to the second network device. The access point identification information is sent by the first network device to the second network device. The second social user information can be sent to the first network device by the second network device, and then sent to the user equipment by the first network device or can be directly sent to the user equipment by the second network device. The solution is completed by the cooperation of the first network device, the second network device and the user equipment. For example, the first network device may be a hotspot server, and the second network device may be a social server. In another example, the first network device and the second network device are on the same server.

Figure 2:
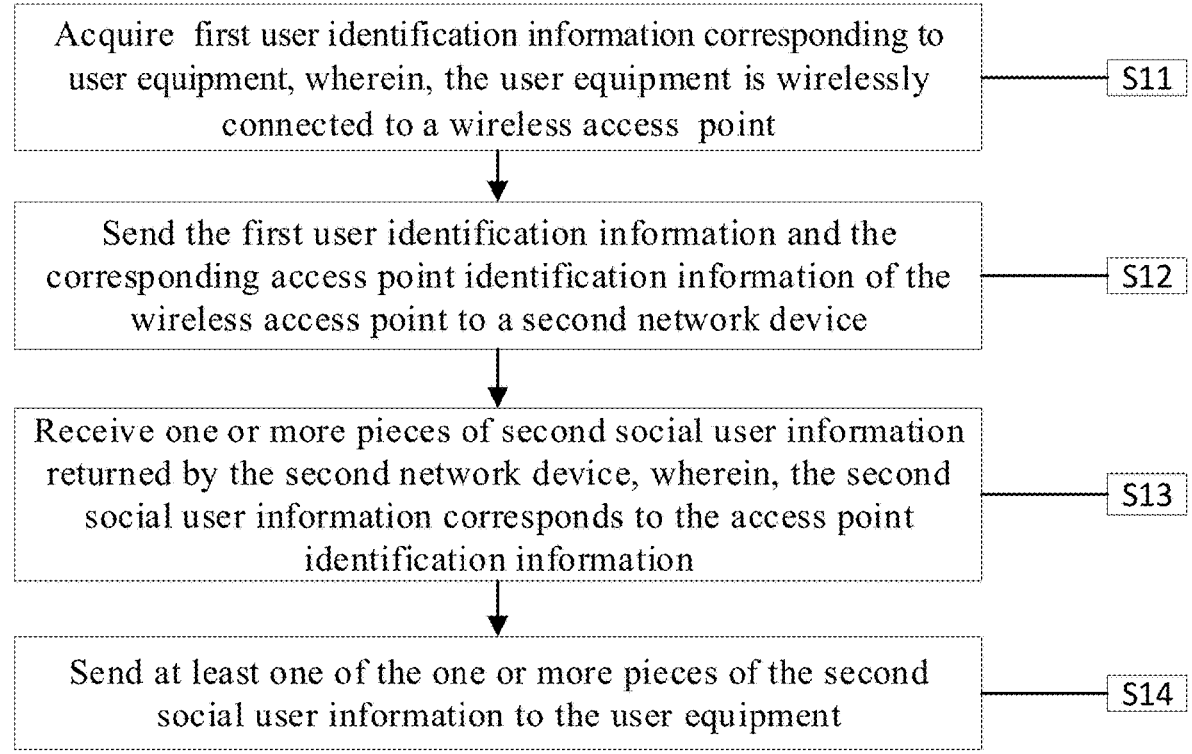
FIG. 2 shows a flowchart of a method for recommending a social user at a first network device end according to an embodiment of the present disclosure.

FIG. 2 shows a method for recommending a social user at the first network device end according to the first aspect of the present disclosure. The method includes step S11, step S12, step S13, and step S14. In step S11, the first network device acquires the first user identification information corresponding to the user equipment, wherein, the user equipment is wirelessly connected to the wireless access point. In step S12, the first network device sends the first user identification information and the corresponding access point identification information of the wireless access point to the second network device. In step S13, the first network device receives one or more pieces of the second social user information returned by the second network device, wherein, the second social user information corresponds to the access point identification information. In step S14, the first network device sends at least one of the one or more pieces of the second social user information to the user equipment.

Specifically, in step S11, the first network device acquires the first user identification information corresponding to the user equipment, wherein, the user equipment is wirelessly connected to the wireless access point. For example, the first user holds the user equipment, and the user equipment establish a wireless connection to a wireless access point. The user equipment sends the first user identification information (such as a mobile phone number, or the like) to the first network device by the wireless connection, and the first network device receives the first user identification information, wherein, the first user identification information may also be the first user identification information which is bound with the access point identification information of the wireless access point.

Then, in step S12, the first network device sends the first user identification information and the corresponding access point identification information of the wireless access point to the second network device. For example, the first network device receives the first user identification information, then sends the first user identification information and the access point identification information of the wireless access point, to which the user equipment is connected to the second network device.

Then, in step S13, the first network device receives the one or more pieces of the second social user information returned by the second network device, wherein, the second social user information corresponds to the access point identification information. For example, the second network device receives the first user identification information and the access point identification information of the wireless access point. Then the second network device consistently generates the one or more pieces of the second social user information, and sends the one or more pieces of the second social user information to the first network device. The first network device receives the one or more pieces of the second social user information, wherein, the device corresponding to the second social user was once connected to the wireless access point, or is in the wireless connection state to the wireless access point.

Finally, in step S14, the first network device sends at least one of the one or more pieces of the second social user information to the user equipment. For example, the first network device receives the one or more pieces of the second social user information, and then returns at least one of the one or more pieces of the second social user information to the user equipment. The user equipment receives at least one of the one or more pieces of the second social user information to complete the recommendation.

For example, user A holds the user equipment (e.g., a mobile phone), and the user equipment establishes a wireless connection to a wireless access point. The hotspot server acquires user A identification information corresponding to the user equipment (such as the mobile phone number authenticated by user A real-name information, the medium access control (MAC) address of the user equipment of user A). For example, the wireless access point invokes the medium access control (MAC) address of the user equipment based on the user' operation, and queries and matches user A identification information in the hotspot server in a mapping relationship table in which the access point identification information matches the wireless access point. The hotspot server sends user A identification information and the access point identification information of the wireless access point, which the user equipment is connected, to the social server. The social server receives user A identification information and the access point identification information of the wireless access point, then correspondingly queries and matches user A with social accounts. According to the access point identification information, one or more pieces of second social user information (such as the social account information of users B and C) in the mapping relationship table, which has stored the social user information and the access point identification information, wherein, the equipment corresponding to the second social user was once connected to the wireless access point or is in the wireless connection state to the wireless access point. The social server sends at least one of the one or more pieces of the second social user information to the hotspot server, and the hotspot server sends the second social user information to the user equipment after receiving. After the user equipment receives and presents the second social user information, user A decides whether to add the second social user as a friend according to the presented second social user information.

Preferably, in step S11, the first network device receives the first user identification information and the access point identification information of the wireless access point uploaded by the wireless connection between the user equipment and the wireless access point. For example, the user equipment establish a wireless connection to a wireless access point, the user equipment uploads the first user identification information and the access point identification information of the wireless access point by the wireless connection between the user equipment and the wireless access point, and then the first network device receives the first user identification information and the access point identification information.

For example, user A holds the user equipment, and the user equipment establishes a wireless connection to a wireless access point. The hotspot server acquires user A identification information corresponding to the user equipment and the access point identification information of the wireless access point. For example, the user equipment sends user A identification information and the access point identification information of the wireless access point to the hotspot server by the wireless connection, and the hotspot server receives user A identification information and the access point identification information of the wireless access point, wherein, user A identification information may be uploaded for the first time or user A identification information is already bound to the access point identification information (such as a SSID (service set identifier)) of the wireless access point. The hotspot server sends user A identification information and the access point identification information of the wireless access point, which the user equipment is connected, to the social server, wherein, the access point identification information of the wireless access point may be sent by the user equipment or acquired by the hotspot server through the communication protocol. The social server receives user A identification information and the access point identification information of the wireless access point, and then correspondingly determines one or more pieces of the second social user information according to the access point identification information. The social server sends at least one of the one or more pieces of the second social user information to the hotspot server, and the hotspot server sends at least one of the one or more pieces of the second social user information to the user equipment after receiving. After the user equipment receives and presents the one or more pieces of the second social user information, user A decides whether to add the second social user as a friend according to the one or more pieces of the second social user information.

Preferably, in step S12, the first network device establishes a first mapping relationship between the first user identification information and the access point identification information of the wireless access point, and sends the first mapping relationship to the second network device. Subsequently, in step S13, the first network device receives one or more pieces of the second social user information returned by the second network device, wherein, the second social user information has a second mapping relationship with the access point identification information. For example, after receiving the first network identifier information, the first network device establishes a first mapping relationship between the first user identifier information and the access point identifier information of the wireless access point according to the connected wireless access point and the frequency of connection to the wireless access point, and stores the first mapping relationship. Meanwhile, the first network device sends the first mapping relationship, the first user identification information and the access point identification information to the second network device, wherein, the first mapping relationship may be newly established or updated on an existing basis. The second network device receives the first user identification information, the access point identification information and the first mapping relationship, and then determines one or more pieces of second social user information in the second mapping relationship table based on the access point identification information, and sends at least one of the one or more pieces of the second social user information to the first network device, wherein, a second mapping relationship is established between the second social user information and the access point identification information. Subsequently, the first network device receives at least one of the one or more pieces of the second social user information.

For example, the user equipment sends user A identification information to the hotspot server by a wireless connection between the user equipment and a wireless access point. The hotspot server receives user A identification information, then establishes or updates the first mapping relationship between user A identification information and the access point identification information of the wireless access point, and stores the first mapping relationship, wherein, the first mapping relationship includes the wireless access point identification information to which user A identification information is connected and the connection frequency. The hotspot server sends user A identification information, the access point identification information of the wireless access point, and the first mapping relationship to the social server. The social server queries the second mapping relationship table according to the access point identification information, and correspondingly determines one or more pieces of second social user information (e.g., social user information of users B, C, and others). The social server sends at least one of the one or more pieces of the second social user information to the hotspot server. The hotspot server receives the second social user information and sends at least one of the second social user information to the user equipment. After the user equipment receives and presents the second social user information sent by the hotspot server, user A decides whether to add the second social user as a friend according to the presented second social user information.

Preferably, the first user identification information includes the first social user information corresponding to the user. Specifically, in step S12, the first network device sends the first user identification information and the corresponding access point identification information of the wireless access point to the second network device, wherein, the second network device provides the social application service to which the first social user information belongs. For example, the first network device sends the first user identification information and the corresponding access point identification information of the wireless access point to the second network device. Wherein, the first user identification information may be the mobile phone number authenticated by the first user real-name information, the MAC address of the mobile phone, or the first social user information of the first user corresponding to the social application service provided by the second network device.

For example, the user equipment sends user A identification information to the hotspot server by a wireless connection between the user equipment and a wireless access point, wherein, user A identification information may be the mobile phone number authenticated by user A real-name information, the MAC address information of the mobile phone, or the social user information of user A corresponding to the social application service of the social server. The hotspot server receives user A identification information. Then establishes or updates the first mapping relationship between user A identification information and the access point identification information of the wireless access point and stores the first mapping relationship. The hotspot server sends user A identification information, the access point identification information, and the first mapping relationship to the social server. The social server correspondingly determines one or more pieces of second social user information (e.g., social user information of users B, C, and others) based on the access point identification information. The social server sends at least one of the one or more pieces of the second social user information to the hotspot server. The hotspot server sends the second social user information to the user equipment after receiving. After the user equipment receives and presents the second social user information, user A decides whether to add the second social user as a friend according to the second social user information.

Preferably, the method further includes step S15 (not shown in the drawings). In step S15, the first network device sends the first social user information corresponding to the first user identification information to the equipment corresponding to the second social user information. For example, after receiving the first user identification information and the access point identification information, the second network device determines one or more pieces of second social user information and the second user identification information corresponding to the second social user information based on the access point identification information in the second mapping relationship table, and determines the first social user information corresponding to the first user in the second network device based on the first user identification information. Subsequently, the second network device sends the second user identification information corresponding to the one or more pieces of the second social user information and the first social user information to the first network device. The first network device receives the second user identification information and the first social user information, and then sends the first social user information to the second user equipment corresponding to the second user identification information. After the second user equipment receives and presents the first social user information, the second user corresponding to the second user equipment decides whether to add the first social user as a friend based on the presented first social user information.

For example, the user equipment sends user A identification information to the hotspot server by a wireless connection between the user equipment and a wireless access point. After receiving user A identification information, the hotspot server sends user A identification information and the access point identification information to the social server. The social server queries in the second mapping relationship table according to the access point identification information, correspondingly determines one or more pieces of second social user information (e.g., social user information of users B, C, and others), and determines the second user identification information corresponding to the second social user in the first mapping relationship table. The social server also determines the social user information of user A corresponding to user A in the social server based on user A identification information. The social server sends at least one of the one or more pieces of the second social user information, the second user identification information, and the social user information of user A to the hotspot server. After receiving the second social user information, the second user identification information, and the social user information of the A, the hotspot server sends the second social user information to the user equipment corresponding to user A. After the user equipment corresponding to user A receives and presents the second social user information, user A decides whether to add the second social user as a friend based on the presented second social user information. The hotspot server also sends the social user information of user A to the second user equipment corresponding to the second user identification information. After the second user equipment receives and presents the social user information of user A, the second user (e.g., user B or C) corresponds to the second user equipment and decides whether to add user A as a friend based on the offered social user information of user A.

Preferably, the method further includes step S16 (not shown in the drawings). In step S16, the first network device determines the preferred second social user information from the one or more pieces of the second social user information. Subsequently, in step S14, the first network device sends at least one of the preferred second social user information to the user equipment. For example, if the first network device receives multiple pieces of the second social user information, the preferred second social user information is determined from the multiple pieces of second social user information based on the first mapping relationship table, and then at least one of the preferred second social user information is sent to the user equipment. Here, the first mapping relationship table may be a set of mapping relationships between all the user equipment, the access point identification information of wireless access points to which all the user equipment is connected and the connection frequency thereof.

For example, the user equipment sends user A identification information to the hotspot server by a wireless connection between the user equipment and a wireless access point. The hotspot server receives user A identification information, then establishes or updates the first mapping relationship between user A identification information and the access point identification information of the wireless access point and stores the first mapping relationship. The hotspot server sends user A identification information, the access point identification information, and the first mapping relationship to the social server, and the social server correspondingly determines one or more pieces of second social user information (e.g., social user information of users B, C, and others), according to the access point identification information. The social server sends at least one of the one or more pieces of the second social user information to the hotspot server. After receiving the second social user information, the hotspot server determines the preferred second social user information based on the first mapping relationship table, and sends the preferred second social user information to the user equipment. After the user equipment receives and presents the preferred second social user information, user A determines whether to add the preferred second social user as a friend, based on the presented preferred second social user information.

Furthermore, the preferred second social user information satisfies at least one of the following requirements: the equipment corresponding to the preferred second social user information is in a wireless connection state to the wireless access point; the connection frequency between the equipment corresponding with the preferred second social user information and the wireless access point reaches a threshold of the connection frequency; the equipment corresponding the preferred second social user information has at least one other same wireless access point as the user equipment; the number of the same wireless access points which the equipment corresponding the preferred second social user information and the user equipment are connected, reaches a threshold of the number of the same hotspots. For example, if the equipment corresponding to the second social user information is in a wireless connection state to the wireless access point, the second social user is selected as the preferred second social user information. In another example, the first network device preferably selects the second social user information according to the first mapping relationship table. In another example, if the number of connection wireless access point of the second user equipment corresponding to the second social user, and the first user equipment reaches a threshold of the connection number, the second social user information is selected as the preferred second social user information. In another example, the first network device organizes the received one or more pieces of the second social user information in descending order according to the connection frequency between the second user equipment corresponding to the second social user information and the wireless access point, and takes the first N pieces of the second social user information as the preferred second social user information. Wherein, N is a preset first number threshold. In another example, if there is at least one other same wireless access point to which the second user equipment corresponding to the second social user information and the first user equipment are connected, the second social user information is selected as the preferred second social user information. In another example, if the number of the same wireless access points to which the second user equipment corresponding to the second social user information and the first user equipment are connected reaches the threshold of the number of the same hotspots, the second social user information is selected as the preferred second social user information. In another example, the first network device organizes the received one or more pieces of the second social user information in descending order according to the number of the same wireless access points to which the second user equipment corresponding to the second social user information and the first user equipment are connected, and takes the first M second social users as the preferred second social user information. Wherein, M is a preset first number threshold.

For example, the user equipment sends user A identification information to the hotspot server by a wireless connection between the user equipment and a wireless access point. The hotspot server receives user A identification information, then establishes or updates the first mapping relationship between user A identification information and the access point identification information of the wireless access point and stores the first mapping relationship. The hotspot server sends user A identification information, the access point identification information and the first mapping relationship to the social server, and the social server correspondingly determines one or more pieces of second social user information (e.g., social user information of users B, C, and others) according to the access point identification information. The social server sends at least one of the one or more pieces of the second social user information to the hotspot server. The hotspot server receives the second social user information, and then preferably selects the second social user information based on the first mapping relationship table. For example, if the equipment corresponding to the second social user information is in the wireless connection state to the wireless access point, the second social user is selected as the preferred second social user information. In another example, if the number of connection wireless access point to which the second user equipment corresponding to the second social user and the first user equipment are connected reaches a threshold of the connection number, the second social user information is selected as the preferred second social user information. In another example, the hotspot server organizes the received one or more pieces of the second social user information in descending order according to the connection frequency between the second user equipment corresponding to the second social user information and the wireless access point, and takes the first N pieces of second social user information as the preferred second social user information, wherein, N is a preset first number threshold. In another example, if there is at least one other same wireless access point to which the second user equipment corresponding to the second social user information and the first user equipment are connected, the second social user information is selected as the preferred second social user information. In another example, if the number of the same wireless access points to which the second user equipment corresponding to the second social user information and the first user equipment are connected reaches the threshold of the number of the same hotspots, the second social user information is selected as the preferred second social user information. In another example, the hotspot server organizes the received one or more pieces of the second social user information in descending order according to the number of the same wireless access points to which the second user equipment corresponding to the second social user information and the first user equipment are connected, and takes the first M pieces of second social user information as the preferred second social user information, wherein, M is a preset first number threshold. The hotspot server sends the preferred second social user information to the user equipment. After the user equipment receives and presents the preferred second social user information, user A decides whether to add the preferred second social user as a friend according to the presented preferred second social user information.

Preferably, in step S14, the first network device sends recommended information about the one or more pieces of the second social user information to the user equipment. For example, the first network device determines a recommended information of the second social user information based on the first mapping relationship table, wherein, the recommended information includes the second social user information and the mapping relationship between the second user identification information corresponding to the second social user information and the access point identification information of the wireless access point. In another example, the first network device generates the recommended information of the second social user information based on the second social user information and the mapping relationship between the second user identification information corresponding to the second social user information and the access point identification information of the wireless access point, so as to assist the first user corresponding to the user equipment in deciding whether to add the second social user information as a friend. Subsequently, the first network device sends the recommended information to the user equipment.

For example, the user equipment sends user A identification information to the hotspot server by a wireless connection between the user equipment and a wireless access point. The hotspot server receives user A identification information, then establishes or updates the first mapping relationship between user A identification information and the access point identification information of the wireless access point and stores the first mapping relationship. The hotspot server sends user A identification information, the access point identification information and the first mapping relationship to the social server. The social server searches in the second mapping relationship table according to the access point identification information, and correspondingly determines one or more pieces of second social user information (e.g., social user information of users B, C, and others). The social server sends at least one of the one or more pieces of the second social user information to the hotspot server. After receiving, the hotspot server determines the recommended information of the second social user information based on the first mapping relationship table. Wherein, the recommended information includes the second social user information and the mapping relationship between the second user identification information corresponding to the second social user information and the access point identification information of the wireless access point. For example, the hotspot server generates the recommended information of the second social user information based on the second social user information and the mapping relationship between the second user identification information corresponding to the second social user information and the access point identification information of the wireless access point. Subsequently, the hotspot server sends the recommended information of the second social user information to the user equipment. After the user equipment receives and presents the recommended information of the second social user information, user A decides whether to add the second social user as a friend according to the existing recommended information of the second social user, wherein, the recommended information is used to assist the first user corresponding to the user equipment to decide whether to add the second social user information as a friend.

Furthermore, the recommended information includes at least one of the following: the access point identification information; the second user identification information corresponding to the second social user information; the connection frequency of the equipment corresponding to the second social user information to the wireless access point; at least one of other same wireless access points between the equipment corresponding to the second social user information and the user equipment. For example, the recommended information may include the wireless access point based on the recommendation. In another example, the recommended information may include the second user identification information (e.g., mobile phone numbers of users B, C, and others) corresponding to the second social user information. In another example, the recommended information may include, in the first mapping relationship table, the connection frequency of the second user equipment corresponding to the second social user information relationship, and the wireless access point. In another example, the recommended information may also include other wireless access points to which both the second user equipment corresponding to the second social user information and the first user equipment are connected, other that this wireless access point.

For example, the user equipment sends user A identification information to the hotspot server by a wireless connection between the user equipment and a wireless access point. The hotspot server receives user A identification information, then establishes or updates the first mapping relationship between user A identification information and the access point identification information of the wireless access point, and stores the first mapping relationship. The hotspot server sends user A identification information, the access point identification information and the first mapping relationship to the social server. The social server queries in the second mapping relationship table according to the access point identification information, and correspondingly determines one or more pieces of second social user information (e.g., social user information of users B, C, and others). The social server sends at least one of the one or more pieces of the second social user information to the hotspot server. After receiving, the hotspot server determines the recommended information of the second social user information based on the first mapping relationship table, wherein, the recommended information includes the second social user and the mapping relationship between the second user identification information corresponding to the second social user information and the access point identification information of the wireless access point. For example, the hotspot server generates the recommended information of the second social user information based on the second social user and the mapping relationship between the second user identification information corresponding to the second social user information and the access point identification information of the wireless access point. Here, the recommended information may include the wireless access point based on the recommendation. The recommended information may include the second user identification information (e.g., mobile phone numbers of users B, C, etc.) corresponding to the second social user information. The recommended information may include the connection frequency of the second user equipment corresponding to the second social user information in the first mapping relationship table to the wireless access point. The recommended information may also include, other wireless access points to which both the second user equipment corresponding to the second social user information and the first user equipment are connected, other than with the wireless access point. Subsequently, the hotspot server sends the recommended information of the second social user information to the user equipment. After the user equipment receives and presents the recommended information of the second social user information, user A decides whether to add the second social user as a friend according to the presented recommended information of the second social user information, wherein, the recommended information is used to assist the first user corresponding to the user equipment to decide whether to add the second social user information as a friend.

Figure 3:
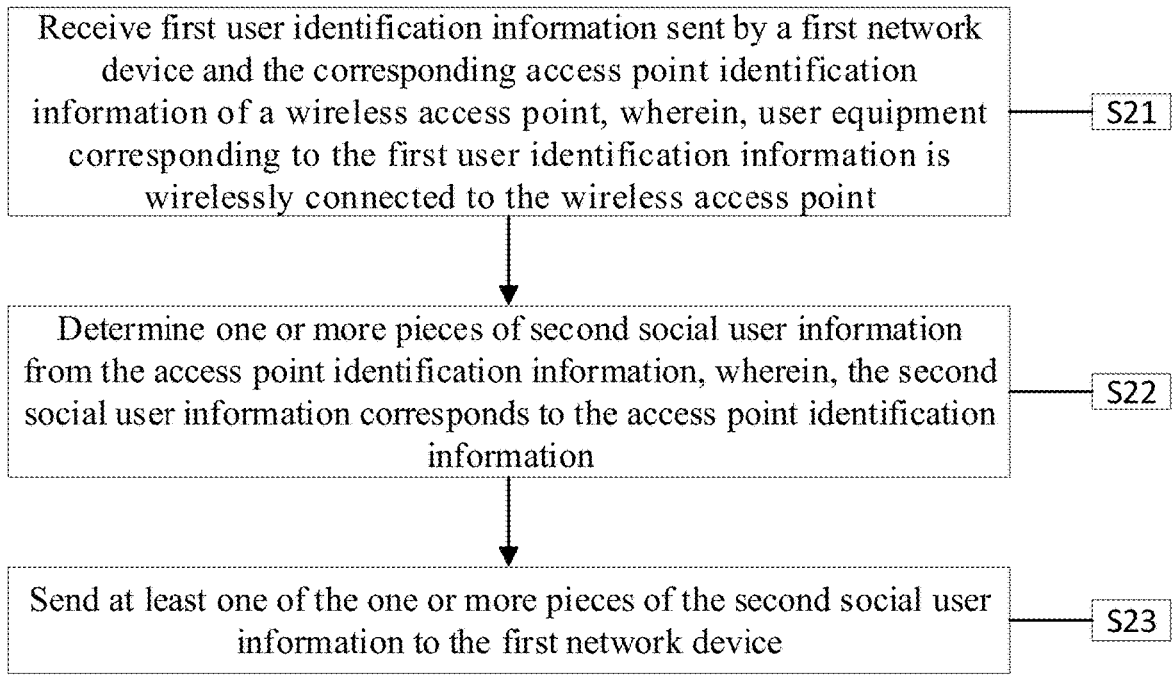
FIG. 3 shows a flowchart of a method for recommending a social user at a second network device end according to an embodiment of the present disclosure.

FIG. 3 shows a method for recommending a social user at the second network device end according to the second aspect of the present disclosure. The method includes step S21, step S22 and step S23. In step S21, the second network device receives the first user identification information sent by the first network device and the corresponding access point identification information of the wireless access point, wherein, the user equipment corresponding to the first user identification information is wirelessly connected to the wireless access point. In step S22, the second network device determines one or more pieces of second social user information according to the access point identification information, wherein, the second social user information corresponds to the access point identification information. In step S23, the second network device sends at least one of the one or more pieces of the second social user information to the first network device. For example, the first network device sends the first user identification information and the corresponding access point identification information of the wireless access point to the second network device. The second network device receives the first user identification information and the access point identification information of the wireless access point, and then correspondingly determines the one or more pieces of the second social user information in the second mapping relationship table based on the access point identification information. Subsequently, the second network device sends at least one of the one or more pieces of the social user information to the first network device.

For example, user A holds the user equipment, and the user equipment establishes a wireless connection to a wireless access point. The hotspot server acquires user A identification information corresponding to the user equipment. The user equipment sends user A identification information to the hotspot server by the wireless connection, and the hotspot server receives user A identification information, wherein, user A identification information may be uploaded for the first time or user A identification information has already moved to the access point identification information (such as a SSID (service set identifier)) of the wireless access point. The hotspot server sends user A identification information and the access point identification information of the wireless access point, which the user equipment is connected to, to the social server. The social server receives user A identification information and the access point identification information of the wireless access point, then queries and matches in the second mapping relationship table according to the access point identification information, and correspondingly determines one or more pieces of second social user information according to the access point identification information, wherein, the second mapping relationship table includes the mapping relationship established between the second social user information and the access point information. The social server sends at least one of the one or more pieces of the second social user information to the hotspot server, and the hotspot server sends the second social user information to the user equipment after receiving. After the user equipment receives and presents the second social user information, user A decides whether to add the second social user as a friend according to the presented second social user information.

Preferably, the first user identification information includes the equipment identification information of the user equipment. Subsequently, in step S22, the second network device determines the first social user information corresponding to the first user identification information according to the equipment identification information. The second network device determines one or more pieces of the second social user information according to the access point identification information, wherein, the second social user information corresponds to the access point identification information, and the first social user information belongs to the same social application as the second social user information. For example, the first user identification information includes the equipment identification information (such as the mobile phone number corresponding to the user equipment, the MAC address, among others) of the user equipment. The second network device determines the first social user information of the first user in the second social application service according to the equipment identification information, and correspondingly determines one or more pieces of the second social user information according to the access point identification information. In another example, if no corresponding first users account is determined based on the first user identification information, the recommended operation is canceled.

For example, user A holds the user equipment, and the user equipment establishes a wireless connection to a wireless access point. The hotspot server acquires user A identification information corresponding to the user equipment. The user equipment sends user A identification information (such as the mobile phone number corresponding to the user equipment, the MAC address, etc.) to the hotspot server by the wireless connection, and the hotspot server receives user A identification information, wherein, user A identification information may be uploaded for the first time or user A identification information has already moved to the access point identification information (such as a SSID (service set identifier)) of the wireless access point. The hotspot server sends user A identification information and the access point identification information of the wireless access point, which the user equipment is connected to the social server. The social server receives user A identification information and the access point identification information of the wireless access point, and determines the social user information of user A corresponding to user A in the social application service based on user A identification information. Then, the social server queries, and matches in the second mapping relationship table, according to the access point identification information, and correspondingly determines one or more pieces of second social user information according to the access point identification information. Wherein, the second mapping relationship table includes the mapping relationship established between the second social user information and the access point information. The social server sends at least one of the one or more pieces of the second social user information to the hotspot server, and the hotspot server sends the second social user information to the user equipment after receiving. After the user equipment receives and presents the second social user information, user A decides whether to add the second social user as a friend according to the presented second social user information. In another example, if no corresponding first user account is determined based on the first user identification information, the recommended operation is canceled.

Further, the method further includes step S24 (not shown in the drawings). In step S24, the second network device establishes and stores the second mapping relationship between the first social user information and the access point identification information. For example, the second network device determines the first social user information, and then establishes or updates the second mapping relationship between the first social user information and the access point identification information and stores the second mapping relationship in the second mapping relationship table, wherein, the second mapping relationship includes the connected access point information and connection frequency of the first social user information.

For example, the user equipment sends user A identification information (such as the mobile phone number corresponding to the user equipment, the MAC address, etc.) to the hotspot server by a wireless connection between the user equipment and a wireless access point. The hotspot server receives user A identification information, and then sends user A identification information and the access point identification information of the wireless access point, which the user equipment is connected to, to the social server. The social server receives user A identification information and the access point identification information of the wireless access point, determines the social user information of user A corresponding to user A in the social application service based on user A identification information, and establishes or updates the second mapping relationship between user A identification information and the access point information, wherein, the second mapping relationship includes the connected access point information and connection frequency of the first social user information. Subsequently, the social server queries and matches in the second mapping relationship table according to the access point identification information, and correspondingly determines one or more pieces of second social user information according to the access point identification information, wherein, the second mapping relationship table includes the mapping relationship established between the second social user information and the access point information. The social server sends at least one of the one or more pieces of the second social user information and the second mapping relationship table to the hotspot server, and the hotspot server sends the second social user information to the user equipment after receiving. After the user equipment receives and presents the second social user information, user A decides whether to add the second social user as a friend according to the presented second social user information.

Preferably, the first user identification information includes the first social user information corresponding to the user. Specifically, in step S22, the second network device determines one or more pieces of second social user information according to the access point identification information, wherein, the second social user information corresponds to the access point identification information. For example, the first user identification information further includes the first social user information corresponding to the first user in the second network device, and the second network device directly establishes the second mapping relationship between the first social user information and the access point information.

For example, the user equipment sends user A identification information (such as the mobile phone number corresponding to the user equipment, the MAC address, etc.) to the hotspot server by a wireless connection between the user equipment and a wireless access point. User A identification information can further include the social user information of user A. The hotspot server receives user A identification information, and then sends user A identification information and the access point identification information of the wireless access point, which the user equipment is connected to the social server. The social server receives user A identification information and the access point identification information of the wireless access point and establishes or updates the second mapping relationship between the social user information of user A and the access point information. Then, the social server determines one or more pieces of second social user information according to the access point identification information. The social server sends at least one of the one or more pieces of the second social user information and the second mapping relationship table to the hotspot server, and the hotspot server sends the second social user information to the user equipment after receiving. After the user equipment receives and presents the second social user information, user A decides whether to add the second social user as a friend according to the presented second social user information.

Preferably, the method further includes step S25 (not shown in the drawings). In step S25, the second network device pre-processes the one or more pieces of the second social user information. Subsequently, in step S23, the second network device sends at least one of the one or more pieces of the pre-processed second social user information to the first network device. For example, the second network device pre-processes the one or more pieces of the second social user information based on the second mapping relationship table and screens out part of the second social user information. Subsequently, the second network device sends at least one of the part of the pre-processed second social user information to the first network device.

For example, the user equipment sends user A identification information (such as the mobile phone number corresponding to the user equipment, the MAC address, etc.) to the hotspot server by a wireless connection between the user equipment and a wireless access point. The hotspot server receives user A identification information, and then sends user A identification information and the access point identification information of the wireless access point, which the user equipment is connected to, to the social server. The social server receives user A identification information and the access point identification information of the wireless access point, and correspondingly determines one or more pieces of second social user information according to the access point identification information. The social server pre-processes the one or more pieces of the second social user information based on the mapping relationship between the second social user information and the access point information in the second mapping relationship table, and then sends at least one of the pre-processed second social user information to the hotspot server, and the hotspot server sends the second social user information to the user equipment after receiving. After the user equipment receives and presents the second social user information, then user A decides whether to add the second social user as a friend according to the presented second social user information.

Further, the pre-processing includes at least one of the following: removing the friend information of the first social user corresponding to the first user identification information from the one or more pieces of the second social user information; selecting the preferred social user information from the one or more pieces of the second social user information, wherein an interaction frequency between the preferred social user and the first social user corresponding to the first user identification information exceed a threshold of the interaction frequency; selecting a preset number of the preferred social user information from the one or more pieces of the second social user information in descending order according to the interaction frequency between the preferred social user and the first social user corresponding to the first user identification information; selecting a preset number of the preferred social user information from the one or more pieces of the second social user information in ascending order according to the interaction frequency between the preferred social user and the first social user corresponding to the first user identification information. For example, if the friend information of the first social user information includes the second social user information, the second social user information is removed. In another example, if an interaction frequency between the second social user information and the first social information exceeds a threshold of the interaction frequency, the second social user information is retained. In another example, the one or more pieces of the second social user information are arranged in descending order according to the interaction frequency between the second social user and the first social user, and the preset number of the second social user information is preferably selected from the one or more pieces of the second social user information. In another example, the one or more pieces of the second social user information are arranged in ascending order according to the interaction frequency between the second social user and the first social user, and the preset number of the second social user information is preferably selected from the one or more pieces of the second social user information.

For example, the user equipment sends user A identification information to the hotspot server by a wireless connection between the user equipment and a wireless access point. The hotspot server receives user A identification information, and then sends user A identification information and the access point identification information of the wireless access point, which the user equipment is connected to the social server. The social server receives user A identification information and the access point identification information of the wireless access point, determines the social user information of user A corresponding to user A in the social application service based on user A identification information, and then correspondingly determines one or more pieces of second social user information according to the access point identification information. The social server pre-processes the one or more pieces of the second social user information based on the mapping relationship between the second social user information and the access point information in the second mapping relationship table. For example, if the friend information of the first social user information includes the second social user information, the second social user information is removed. In another example, if an interaction frequency between the second social user information and the first social information exceeds a threshold of the interaction frequency, the second social user information is retained. In another example, the one or more pieces of the second social user information are arranged in descending order according to the interaction frequency between the second social user and the first social user, and the preset number of the second social user information is preferably selected from the one or more pieces of the second social user information. In another example, the one or more pieces of the second social user information are arranged in ascending order according to the interaction frequency between the second social user and the first social user, and the preset number of the second social user information is preferably determined from the one or more pieces of the second social user information. The social server sends at least one of the pre-processed second social user information to the hotspot server, and the hotspot server sends the second social user information to the user equipment after receiving. After the user equipment receives and presents the second social user information, user A decides whether to add the second social user as a friend according to the presented second social user information.

Figure 4:
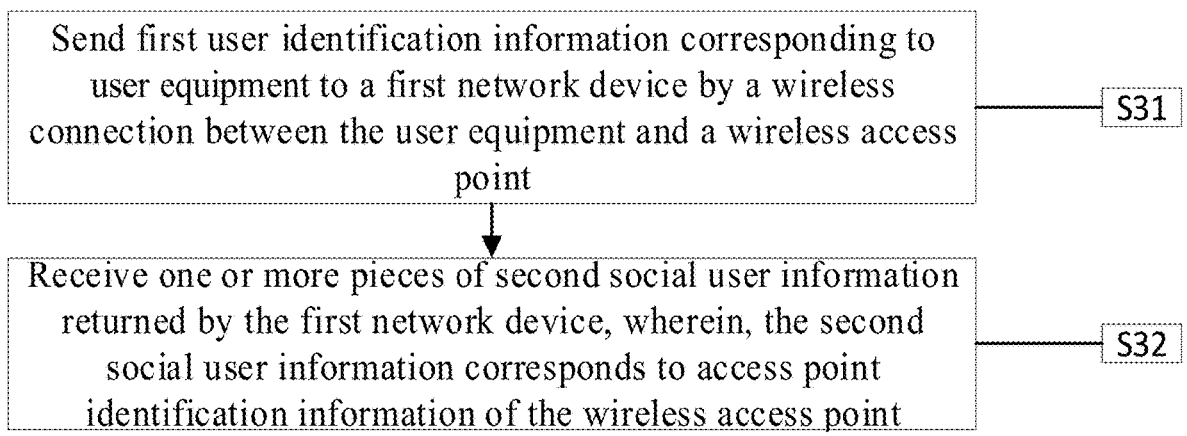
FIG. 4 shows a flowchart of a method for recommending a social user at user equipment end according to an embodiment of the present disclosure.

FIG. 4 shows a method for recommending a social user at the user equipment end according to the third aspect of the present disclosure. The method includes step S31 and step S32. In step S31, the user equipment sends the first user identification information corresponding to the user equipment to the first network device by a wireless connection between the user equipment and a wireless access point. In step S32, the user equipment receives one or more pieces of second social user information returned by the first network device, wherein, the second social user information corresponds to access point identification information of the wireless access point. For example, the user equipment sends the first user identification information to the first network device by the wireless connection between the user equipment and the wireless access point. After receiving the first user identification information, the first network sends the first user identification information and the access point identification information to the second network device. After receiving the first user identification information and the access point identification information, the second network device correspondingly determines the second social user information based on the access point identification information, and sends the second social user information to the first network device. The first network device receives, and then sends the second social user information to the user equipment. After the user equipment receives and presents the second social user information, the first user determines whether to add the second social user as a friend based on the presented information.

For example, user A holds the user equipment (e.g., a mobile phone), and the user equipment establishes a wireless connection to a wireless access point. The hotspot server acquires user A identification information corresponding to the user equipment (such as the mobile phone number authenticated by user A real-name information, the medium access control (MAC) address of the user equipment of user A). For example, the wireless access point invokes the medium access control (MAC) address of the user equipment based on the user operation, and queries and matches user A identification information in the hotspot server in a mapping relationship table in which the access point identification information matches the wireless access point. The hotspot server sends user A identification information and the access point identification information of the wireless access point, which the user equipment is connected to the social server. The social server receives user A identification information and the access point identification information of the wireless access point, and then correspondingly inquires and matches. According to the access point identification information, one or more pieces of second social user information (such as the social account information of users B and C) in the mapping relationship table which has stored the social user information and the access point identification information. The social server sends at least one of the one or more pieces of the second social user information to the hotspot server, and the hotspot server sends the second social user information to the user equipment after receiving. After the user equipment receives and presents the second social user information, user A decides whether to add the second social user A as a friend according to the presented second social user information.

Preferably, in step S31, if the user sending operation is acquired, the user equipment sends the first user identification information corresponding to the user equipment to the first network device by a wireless connection between the user equipment and a wireless access point. For example, based on the user's operation in the user equipment, the user equipment sends the first user identification information to the first network device by the wireless connection between the user equipment and the wireless access point.

For example, user A holds the user equipment (e.g., a mobile phone), and the user equipment establishes a wireless connection to a wireless access point. Based on the operation of user A in the user equipment, the user equipment sends the first user identification information to the hotspot server by a wireless connection between the user equipment and a wireless access point. The hotspot server sends user A identification information and the access point identification information of the wireless access point, which the user equipment is connected to, to the social server. The social server receives user A identification information and the access point identification information of the wireless access point, and then correspondingly inquires and matches, according to the access point identification information, one or more pieces of second social user information (such as the social account information of users B and C) in the mapping relationship table which has stored the social user information and the access point identification information. The social server sends at least one of the one or more pieces of the second social user information to the hotspot server, and the hotspot server sends the second social user information to the user equipment after receiving. After the user equipment receives and presents the second social user information, user A decides whether to add the second social user as a friend according to the presented second social user information.

Preferably, the first user identification information includes the social user information corresponding to the user in the social application of the user equipment. For example, the first user identification information may also include the first social user information corresponding to the first user in the second network device.

For example, based on the user's operation, the user equipment sends user A identification information to the hotspot server by a wireless connection between the user equipment and a wireless access point, wherein, user A identification information may include the mobile phone number authenticated by user A real-name information, or the MAC address information of the mobile phone, or may include the social user information corresponding to user A in the social application service of the social server. The hotspot server receives user A identification information, and then sends user A identification information, the access point identification information and the first mapping relationship to the social server. The social server inquires in the second mapping relationship table according to the access point identification information, and correspondingly determines one or more pieces of second social user information (e.g., social user information of users B, C, and other). The social server sends at least one of the one or more pieces of the second social user information to the hotspot server. After receiving, the hotspot server sends the second social user information to the user equipment. After the user equipment receives and presents the second social user information, user A decides whether to add the second social user as a friend according to the presented second social user information.

According to the fourth aspect of the present disclosure, a method for recommending a social user at the first network device end is provided. The method includes step s11 and step s12. In step s11, the first network device acquires the first user identification information corresponding to the user equipment, wherein, the user equipment is wirelessly connected to a wireless access point. In step s12, the first network device sends the first user identification information and the corresponding access point identification information of the wireless access point to the second network device. For example, the first network device acquires the first user identification information corresponding to the user equipment, and sends the first user identification information and the access point identification information of the wireless access point to the second network device. After receiving the first user identification information and the access point identification information of the wireless access point, the second network device correspondingly determines the second social account information based on the access point identification information, and then directly sends the second social account information to the user equipment.

For example, user A holds the user equipment (e.g., a mobile phone), and the user equipment establishes a wireless connection to a wireless access point. The hotspot server acquires user A identification information corresponding to the user equipment (such as the mobile phone number authenticated by user A real-name information, or the medium access control (MAC) address of the user equipment of user A). For example, the wireless access point invokes the medium access control (MAC) address of the user equipment based on the user' operation, and inquires and matches user A identification information in the hotspot server in a mapping relationship table in which the access point identification information matches the wireless access point. The hotspot server sends user A identification information and the access point identification information of the wireless access point, which the user equipment is connected to the social server. The social server receives user A identification information and the access point identification information of the wireless access point, and then correspondingly determines one or more pieces of second social user information (such as the social account information of users B and C). The social server sends at least one of the one or more pieces of the second social user information to the user equipment. After the user equipment receives and presents the second social user information, user A decides whether to add the second social user as a friend according to the presented second social user information.

According to the fifth aspect of the present disclosure, a method for recommending a social user at the second network device end is provided. The method includes step s21, step s22 and step s23. In step s21, the second network device receives the first user identification information sent by the first network device and the corresponding access point identification information of the wireless access point, wherein, the user equipment corresponding to the first user identification information is wirelessly connected to the wireless access point. In step s22, the second network device determines one or more pieces of second social user information based on the access point identification information, wherein, the second social user information corresponds to the access point identification information. In step s23, the second network device sends at least one of the one or more pieces of the second social user information to the user equipment. For example, the second network device receives the first user identification information and the access point identification information, inquires and matches in the second mapping table, determines one or more pieces of second social account information corresponding to the access point identification information, and then directly sends at least one of the one or more pieces of the second social account information to the user equipment.

For example, user A holds the user equipment (e.g., a mobile phone), and the user equipment establishes a wireless connection to a wireless access point. The user equipment sends user A identification information to the hotspot server. The hotspot server receives user A identification information and then sends user A identification information and the access point identification information of the wireless access point, which the user equipment is connected to the social server. The social server receives user A identification information and the access point identification information of the wireless access point, and then correspondingly inquires, matches and determines, according to the access point identification information, one or more pieces of second social user information (such as the social account information of users B and C) in the second mapping relationship table which has stored the social user information and the access point identification information. The social server sends at least one of the one or more pieces of the second social user information to the user equipment. After the user equipment receives and presents the second social user information, user A decides whether to add the second social user as a friend according to the presented second social user information.

According to the sixth aspect of the present disclosure, a method for recommending a social user at the user equipment end is provided. The method includes step s31 and step s32. In step s31, the user equipment sends the first user identification information corresponding to the user equipment to the first network device by the wireless connection between the user equipment and the wireless access point. In step s32, the user equipment receives one or more pieces of second social user information returned by the second network device, wherein, the second social user information corresponds to the access point identification information of the wireless access point.

For example, user A holds the user equipment (e.g., a mobile phone), and the user equipment establishes a wireless connection to a wireless access point. Based on the operation of user A, the user equipment sends user A identification information to the hotspot server by the wireless connection to the wireless access point. The hotspot server receives user A identification information and then sends user A identification information and the access point identification information of the wireless access point, which the user equipment is connected to, to the social server. The social server receives user A identification information and the access point identification information of the wireless access point, and then correspondingly inquires, matches and determines, according to the access point identification information, one or more pieces of second social user information (such as the social account information of users B and C) in the second mapping relationship table which has stored the social user information and the access point identification information. The social server sends at least one of the one or more pieces of the second social user information to the user equipment. After the user equipment receives and presents the second social user information, user A decides whether to add the second social user as a friend according to the presented second social user information.

According to the seventh aspect of the present disclosure, a method for recommending a social user at the second network device end is provided. The method includes step A21, step A22 and step A23. In step A21, the second network device receives the first user identification information sent by the user equipment and the corresponding access point identification information of the wireless access point, wherein, the user equipment is wirelessly connected to the wireless access point. In step A22, the second network device determines one or more pieces of second social user information based on the access point identification information, wherein, the second social user information corresponds to the access point identification information. In step A23, the second network device sends at least one of the one or more pieces of the second social user information to the user equipment. For example, the second network device receives the first user identification information and the access point identification information sent by the user equipment, inquires and matches in the second mapping table, correspondingly determines one or more pieces of second social account information corresponding to the access point identification information, and then directly sends at least one of the one or more pieces of the second social account information to the user equipment.

For example, user A holds the user equipment (e.g., a mobile phone), and the user equipment establishes a wireless connection to a wireless access point. The user equipment sends user A identification information and the access point identification information of the wireless access point, which the user equipment is connected to the social server. The social server receives user A identification information and the access point identification information of the wireless access point, and then correspondingly inquires, matches and determines, according to the access point identification information, one or more pieces of second social user information (such as the social account information of users B and C) in the second mapping relationship table which has stored the social user information and the access point identification information. The social server sends at least one of the one or more pieces of the second social user information to the user equipment. After the user equipment receives and presents the second social user information, user A decides whether to add the second social user as a friend according to the presented second social user information.

According to the eighth aspect of the present disclosure, a method for recommending a social user at the user equipment end is provided. The method includes step A31 and step A32. In step A31, the user equipment sends the first user identification information corresponding to the user equipment and the corresponding access point identification information of the wireless access point to the second network device, wherein, the user equipment is wirelessly connected to the wireless access point. In step A32, the user equipment receives one or more pieces of second social user information returned by the second network device, wherein, the second social user information corresponds to the access point identification information of the wireless access point. For example, the user equipment establishes the wireless connection to the wireless access point, and sends the access point identification information of the wireless access point and the first user identification information corresponding to the user equipment to the second network device. After the second network device determines the second social user information, the user equipment receives the second social user information sent by the second network device to complete the recommendation.

For example, user A holds the user equipment (e.g., a mobile phone), and the user equipment establishes a wireless connection to a wireless access point. Based on the operation of user A, the user equipment sends user A identification information and the access point identification information of the wireless access point, which the user equipment is connected to, to the social server by the wireless connection to the wireless access point. The social server receives user A identification information and the access point identification information of the wireless access point, and then correspondingly queries, matches and determines, according to the access point identification information, one or more pieces of second social user information (such as the social account information of users B and C) in the second mapping relationship table which has stored the social user information and the access point identification information. The social server sends at least one of the one or more pieces of second social user information to the user equipment. After the user equipment receives and presents the second social user information, user A decides whether to add the second social user as a friend according to the presented second social user information.

Figure 5:
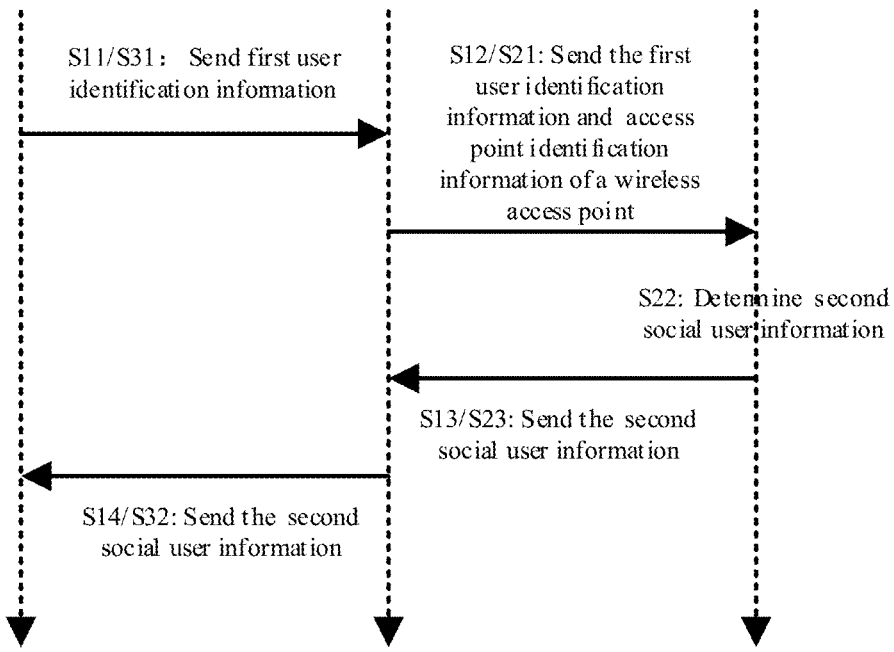
FIG. 5 shows a schematic diagram of a system for recommending a social user according to the ninth aspect of the present disclosure.

FIG. 5 shows a method for recommending a social user according to the ninth aspect of the present disclosure, and the method includes the following.

The user equipment sends the first user identification information corresponding to the user equipment to the first network device by the wireless connection between the user equipment and the wireless access point.

The first network device acquires the first user identification information and sends the first user identification information and the corresponding access point identification information of the wireless access point to the second network device.

The second network device receives the first user identification information and the corresponding access point identification information, and determines one or more pieces of second social user information according to the access point identification information, wherein, the second social user information corresponds to the access point identification information.

The second network device sends at least one of the one or more pieces of the second social user information to the first network device.

The first network device receives the one or more pieces of the second social user information, and sends at least one of the one or more pieces of the second social user information to the user equipment.

The user equipment receives the one or more pieces of the second social user information.

Figure 6:
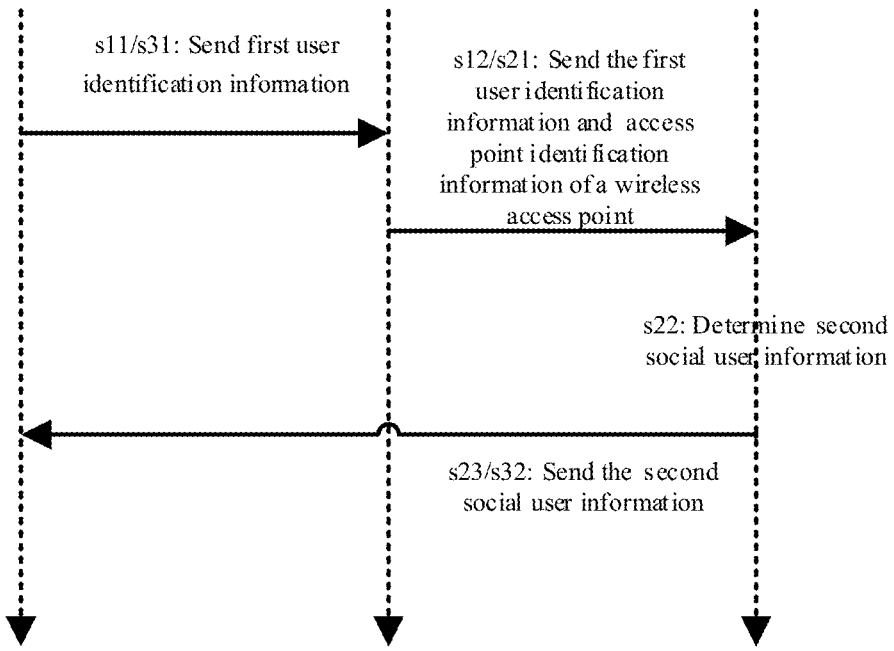
FIG. 6 shows a schematic diagram of a system for recommending a social user according to the tenth aspect of the present disclosure.

FIG. 6 shows a method for recommending a social user according to the tenth aspect of the present disclosure, and the method includes the following.

The user equipment sends the first user identification information corresponding to the user equipment to the first network device by the wireless connection between the user equipment and the wireless access point.

The first network device acquires the first user identification information and sends the first user identification information and the corresponding access point identification information of the wireless access point to the second network device.

The second network device receives the first user identification information and the corresponding access point identification information, and determines one or more pieces of second social user information according to the access point identification information, wherein, the second social user information corresponds to the access point identification information.

The second network device sends at least one of the one or more pieces of the second social user information to the user equipment.

The user equipment receives the one or more pieces of the second social user information.

Figure 7:
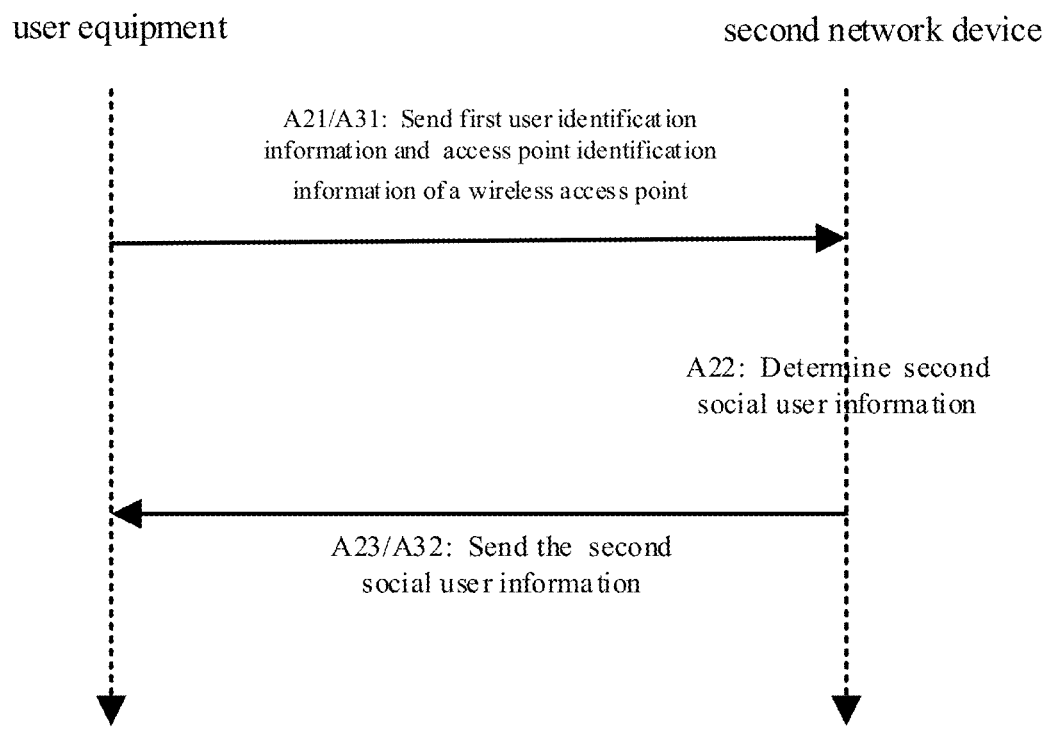
FIG. 7 shows a schematic diagram of a system for recommending a social user according to the eleventh aspect of the present disclosure.

FIG. 7 shows a method for recommending a social user according to the eleventh aspect of the present disclosure, and the method includes the following.

The user equipment sends the first user identification information corresponding to the user equipment and the corresponding access point identification information of the wireless access point to the second network device, wherein, the user equipment is wirelessly connected to the wireless access point.

The second network device receives the first user identification information and the corresponding access point identification information, and determines one or more pieces of second social user information according to the access point identification information, wherein, the second social user information corresponds to the access point identification information.

The second network device sends at least one of the one or more pieces of the second social user information to the user equipment.

The user equipment receives the one or more second social user information.

It should be noted that the present disclosure may be implemented in software and/or a combination of software and hardware, for example, may be implemented by using an application specific integrated circuit (ASIC), a general-purpose computer, or any other similar hardware device. In an embodiment, the software program in the present disclosure may be executed by a processor to implement the steps or functions described above. Similarly, the software program (including related data structures) in the present disclosure may be stored in a computer-readable recording medium such as a RAM memory, a magnetic drive, an optical drive or a floppy disk, and the like. In addition, some of the steps or functions of the present disclosure may be implemented in hardware, such as, a circuit that cooperates with the processor to perform the steps or functions.

In addition, a part of the present disclosure may be applied to a computer program product, such as a computer program instruction. The computer program instruction, when executed by a computer, may invoke or provide a method and/or technical solution according to the present disclosure by operations of the computer. Those skilled in the art should understand that a form of the computer program instruction in the computer-readable medium includes, but is not limited to, a source file, an executable file, an installation package file, and the like. Accordingly, a manner in which the computer program instruction is executed by the computer includes, but is not limited to the following. The computer directly executes the instruction. The computer compiles the instruction and then executes the corresponding compiled program. The computer reads and executes the instruction. The computer reads and installs the instruction and then executes the corresponding installed program. In this case, the computer-readable medium may be any available computer-readable storage medium or communication medium that can be accessed by the computer.

Communication media include media that can be transferred from one system to another system by communication signals, and the communication signals include computer-readable instructions, data structures, program modules, or other data. Communication media may include conductive transmission media (such as cables and wires (for example, fiber optics, coaxial, and the like)) and wireless (transmission without conduction) media capable of propagating energy waves such as acoustic, electromagnetic, radio frequency (RF), microwave, and infrared. Computer-readable instructions, data structures, program modules, or other data may be embodied, for example, as modulated data signals in a wireless medium (such as a carrier wave or a similar mechanism embodied as a part of the spread spectrum technology). The term "modulated data signal" refers to a signal whose one or more features are altered or set in such a manner as to encode information in the signal. Modulation may be analog, digital or hybrid modulation techniques.

As an example, instead of limitation, the computer-readable storage medium includes volatile media, non-volatile media, movable media and immovable media implemented by using any method or technology for storing information such as computer-readable instructions, data structures, program modules, or other data. For example, the computer-readable storage medium includes, but is not limited to, volatile memories such as random access memories (RAM, DRAM, SRAM); and nonvolatile memories such as a flash memory, various read-only memories (ROM, PROM, EPROM, EEPROM), magnetic and ferromagnetic/ferroelectric memories (MRAM, FeRAM); and magnetic and optical storage devices (hard disk, magnetic tape, CD, DVD); or other currently known media or media developed in the future and capable of storing computer-readable information/data used by computer systems.

Herein, a device in an embodiment of the present disclosure includes a memory for storing computer program instructions and a processor for executing the computer program instructions, wherein, when, the computer program instructions are executed by the processor, the device is driven to perform the aforementioned methods and/or technical solutions of a plurality of the embodiments of the present disclosure.

It is apparent to those skilled in the art that the present disclosure is not limited to details of the above exemplary embodiments, and the present disclosure may be implemented in other implementations without departing from the spirit or basic features of the present disclosure. Therefore, the embodiments should be considered as exemplary and non-limiting from any point of view. The scope of the present disclosure is defined by the appended claims rather than the above descriptions. Therefore, all changes that fall within the meaning and scope of equivalents of the claims are included in the present disclosure. Any reference signs in the claims should not be construed as limiting the claims. In addition, it is apparent that the word "include" does not exclude other elements or steps, and the singular does not exclude the plural. The plurality of units or devices stated in the claims of the device may also be implemented by a unit or device through software or hardware. The words such as "first", "second", and the like are used to denote names and do not denote any particular order.

What is claimed is:

1. A method for recommending a social user at a first network device end, comprising:
　acquiring, by the first network device, a first user identification information corresponding to a user equipment, wherein, the user equipment is wirelessly connected to a wireless access point;
　sending, by the first network device, the first user identification information and a corresponding access point identification information of the wireless access point to a second network device;
　receiving, by the first network device, one or more pieces of second social user information returned by the second network device, wherein, the second social user information corresponds to the access point identification information;
　determining, by the first network device, a preferred second social user information from the one or more pieces of the second social user information; and
　sending, by the first network device, at least one of the preferred second social user information to the user equipment;
　wherein the preferred second social user information satisfies a requirement of a number of same wireless access points between the device corresponding the preferred second social user information and the user equipment reaches a threshold of the number of same wireless access points.

2. The method according to claim 1, wherein, the step of acquiring the first user identification information corresponding to the user equipment comprises:
　receiving the first user identification information and the corresponding access point identification information of the wireless access point uploaded by the user equipment via the wireless connection between the user equipment and the wireless access point.

3. The method according to claim 1, wherein, the step of sending the first user identification information and the corresponding access point identification information of the wireless access point to the second network device comprises:
　establishing a first mapping relationship between the first user identification information and the access point identification information of the wireless access point and sending the first mapping relationship to the second network device;
　the step of receiving the one or more pieces of the second social user information returned by the second network device comprises:
　receiving the one or more pieces of the second social user information returned by the second network device, wherein, the second social user information has a second mapping relationship with the access point identification information.

4. The method according to claim 1, wherein, the first user identification information comprises the first social user information corresponding to a user;
　the step of sending the first user identification information and the corresponding access point identification information of the wireless access point to the second network device comprises:
　sending the first user identification information and the corresponding access point identification information of the wireless access point to the second network device, wherein, the second network device provides a social application service, and the first social user information belongs to the social application service.

5. The method according to claim 1, further comprising:
　sending the first social user information corresponding to the first user identification information to a device corresponding to the second social user information.

6. A method recommending a social user at a second network device end, comprising:
　receiving, by the second network device, a first user identification information sent by a first network device and a corresponding access point identification information of a wireless access point, wherein, a user equipment corresponding to the first user identification information is wirelessly connected to the wireless access point;

determining, by the second network device, one or more pieces of second social user information according to the access point identification information, wherein, the second social user information corresponds to the access point identification information; and sending, by the second network device, at least one of the one or more pieces of the second social user information to the first network device;

wherein the at least one of the one or more pieces of the second social user information is configured for the first network device to determine a preferred second social user information;

wherein the preferred second social user information is configured to be sent from the first network device to the user equipment; and wherein the preferred second social user information satisfies a requirement of a number of same wireless access points between the device corresponding the preferred second social user information and the user equipment reaches a threshold of the number of same wireless access points.

7. The method according to claim 6, wherein, the first user identification information comprises a device identification information of the user equipment;

the step of determining the one or more pieces of the second social user information according to the access point identification information comprises:

determining a first social user information corresponding to the first user identification information according to the device identification information; and determining the one or more pieces of the second social user information according to the access point identification information, wherein, the second social user information corresponds to the access point identification information, and the first social user information belongs to a same social application as the second social user information.

8. The method according to claim 7, further comprising:
establishing and storing a second mapping relationship between the first social user information and the access point identification information.

9. The method according to claim 6, wherein, the first user identification information comprises the first social user information corresponding to a user, and the second social user information corresponds to the access point identification information.

10. A method for recommending a social user at a user equipment end, comprising:

sending, by the user equipment, a first user identification information corresponding to a user equipment to a first network device by a wireless connection between the user equipment and a wireless access point; and receiving, by the user equipment, one or more pieces of second social user information returned by the first network device, wherein, the second social user information corresponds to an access point identification information of the wireless access point;

wherein the received one or more pieces of the second social user information includes a preferred second social user information determined by the first network device; and wherein the preferred second social user information satisfies a requirement of a number of same wireless access points between the device corresponding the preferred second social user information and the user equipment reaches a threshold of the number of same wireless access points.

11. The method according to claim 10, wherein, the step of sending the first user identification information corresponding to the user equipment to the first network device by the wireless connection between the user equipment and the wireless access point comprises:

when a sending operation of the user is acquired, sending the first user identification information corresponding to the user equipment to the first network device by the wireless connection between the user equipment and the wireless access point.

12. The method according to claim 10, wherein, the first user identification information includes a social user information corresponding to a user in a social application of the user equipment.

* * * * *